(12) United States Patent
Mear et al.

(10) Patent No.: US 10,679,116 B2
(45) Date of Patent: Jun. 9, 2020

(54) CONTACTLESS SMART CARD COMPRISING AN ANTENNA OPTIMIZED TO ALLOW EMBOSSING OF CHARACTERS

(71) Applicant: SMART PACKAGING SOLUTIONS, Rousset (FR)

(72) Inventors: Benjamin Mear, Rousset (FR); Haig Kambourian, Rousset (FR); Deborah Teboul, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 15/554,353

(22) PCT Filed: Mar. 4, 2016

(86) PCT No.: PCT/FR2016/000036
§ 371 (c)(1),
(2) Date: Aug. 29, 2017

(87) PCT Pub. No.: WO2016/139395
PCT Pub. Date: Sep. 9, 2016

(65) Prior Publication Data
US 2018/0046893 A1    Feb. 15, 2018

(30) Foreign Application Priority Data

Mar. 4, 2015    (FR) ..................................... 15 00412

(51) Int. Cl.
*G06K 19/077*    (2006.01)
*G06K 19/04*    (2006.01)

(52) U.S. Cl.
CPC . *G06K 19/07769* (2013.01); *G06K 19/07749* (2013.01); *G06K 19/07773* (2013.01); *G06K 19/042* (2013.01)

(58) Field of Classification Search
CPC ....... G06K 19/07769; G06K 19/07773; G06K 19/042
See application file for complete search history.

(56) References Cited

U.S. PATENT DOCUMENTS

| | | | |
|---|---|---|---|
| 6,049,461 A | 4/2000 | Haghiri-Tehrani et al. | |
| 2001/0030238 A1 | 10/2001 | Arisawa | |
| 2015/0021402 A1* | 1/2015 | Finn ................. | G06K 19/07794 235/492 |

FOREIGN PATENT DOCUMENTS

EP        1 107 175 A2    6/2001

OTHER PUBLICATIONS

International Search Report (PCT/ISA/210) dated Jun. 8, 2016, by the French Patent Office as the International Searching Authority for International Application No. PCT/FR2016/000036.

* cited by examiner

*Primary Examiner* — Sonji N Johnson
(74) *Attorney, Agent, or Firm* — Buchanan Ingersoll & Rooney PC

(57) ABSTRACT

The invention relates to an antenna for a contactless smart card, arranged on an insert intended to be integrated in said smart card having a certain relative vertical or horizontal positioning tolerance T between the insert and the body of the card, said smart card being provided with an embossing area comprising lines of characters embossed in relief, at least one antenna coil being situated opposite the embossing area, wherein said coil comprises at least one pair of paths situated in the embossing area and connected in parallel, said paths being configured in such a way that at least one of same remains at least partially situated outside of the embossed character area whatever the relative position of the insert and the antenna of same allowed by the tolerance T.

11 Claims, 4 Drawing Sheets

CONTACTLESS SMART CARD COMPRISING AN ANTENNA OPTIMIZED TO ALLOW EMBOSSING OF CHARACTERS

The invention concerns contactless or hybrid identification cards operating with or without contact and including an area of embossed characters on the card body and an antenna integrated into the card body to communicate remotely with a card reader. Contactless bank cards conforming to the ISO 7816-1 format constitute the most widespread example of the identification cards to which the invention applies.

PRIOR ART

Most known contactless smart cards or dual cards operating with and without contact include a card body, an electronic module inserted in a cavity of the card body and including a microelectronic die, and an antenna disposed in the card body and electrically connected to output terminals of the microelectronic die.

Alternatively, there are smart cards in which the antenna of the card body is coupled inductively with the electronic module that itself includes an antenna.

The antenna of the card body generally consists of turns consisting of electrically conductive tracks produced on a flexible substrate or insert that is integrated into the card body during the assembly of the card.

In order to obtain adequate contactless communication performance, and in particular a sufficient operating range, the turns of the antenna must be of large size, typically conforming to the so-called ID1 format. The ID-1 format for smart cards has measurements of 85.60×53.98 mm. It is commonly used for bank cards.

Now the card body further includes an embossing area including alphanumeric characters in relief conforming to the ISO 7811-1 standard.

Given the format of the antenna, there generally exists an area of overlap between the embossed characters area and the electrically conductive tracks of the antenna.

Now, the embossing process for creating characters in relief by stamping on the finished card body integrating the insert including the antenna can damage or even cut the antenna tracks in the area in which the antenna and the embossed characters must coexist.

In order to remedy the cutting of the antenna tracks there is provision in the prior art for producing antenna tracks wider than the maximum height of the embossed characters so that the embossing of the characters is not able to cut an antenna track completely. But this problem is complicated by the fact that the tolerance for positioning the antenna in the card body is of the order of 1.5 mm. Consequently, to ensure that an antenna track resists the embossing its width must be greater than the height of a character plus the antenna positioning tolerance.

The documents U.S. Pat. No. 6,049,461 A1 and EP 1 107 175 A2 are representative of this prior art, in which the tracks situated in the embossing area are merely widened beyond the height of the embossed characters to leave a turn portion that is not cut by the embossing.

However, this widening of the antenna tracks has created a new problem in that experience shows that wider antenna tracks degrade the cohesion of the layers constituting the card body. To be more precise, it proves that the card body is subject to delamination and therefore to separation of the external protection layers of the card. This delamination occurs primarily at the level of the wide antenna tracks. Consequently, the wider the antenna tracks, the greater the risk of delamination.

Moreover, it is intended that the CQM2.03 standard relating to the resistance to delamination will be made more severe, the adhesion of the conductive tracks of the antenna having to resist stresses of 7 Newton/$cm^2$, instead of 3.5 N/$cm^2$ as previously.

OBJECT OF THE INVENTION

Consequently the general object of the invention is to propose an optimized antenna design making it possible to solve the technical problem referred to above.

SUMMARY OF THE INVENTION

According to the principle of the invention, the wide tracks located under the embossing area are divided into two or more narrower tracks therefore less sensitive to delamination and electrically connected in parallel. Moreover, in order to prevent these narrower tracks from being cut when embossing the characters the narrow tracks are positioned on the insert in such a way that at least one of the tracks of each set of tracks in parallel remains outside the area of the characters, in such a manner that the embossing operation can never cut the electrical continuity of the antenna, even allowing for the tolerance for positioning the antenna (and therefore the tracks) in the card body.

Consequently the invention consists in an antenna for a contactless smart card, arranged on an insert intended to be integrated in said smart card with a certain relative vertical or horizontal positioning tolerance T between the insert and the body of the card, said smart card including an embossing area comprising lines of characters embossed in relief, at least one antenna turn being situated opposite the embossing area, characterized in that said turn comprises at least one pair of tracks situated in the embossing area and connected in parallel, said tracks being configured in such a way that at least one of them remains at least partially situated outside of the embossed character area whatever the relative position of the insert and its antenna allowed by the tolerance T.

According to a first track configuration, the lines of characters have a height h and are separated by a line spacing of width i and the antenna includes a pair of tracks connected in parallel and each situated at least partially facing at least one line of characters and a pair of tracks of the antenna are spaced by an interval $d1=h+i$.

In this case, the width l of the tracks connected in parallel is substantially equal to $T-i+2c$ where T designates the tolerance for positioning of the antenna in the card body, i designates the interval between two lines of characters, and c designates the minimum track width permissible to ensure the electrical continuity of the track.

Moreover, the positioning and the sizing of a pair of tracks are such that if a first track impinges by an amount c on a line spacing between two lines of characters the other track also impinges by an amount c on another line spacing between two other lines of characters.

In this embodiment, the width of the tracks is substantially equal to 1.5 mm. According to another track configuration, the lines of characters have a height h and are separated by a line spacing of width i and the antenna includes a first track of width $l1$ situated at least partially facing at least one line of characters and a second track of width $l2$ situated at the periphery of the embossing area, and the tracks are spaced by an interval $d2=h-l1$. In this case, the widths $l1$, $l2$ of the respective tracks are substantially equal to l1=T−i+c and l2=c, where T designates the tolerance for positioning the antenna in the card body, designates the interval between two lines of characters, and c designates the minimum remaining track thickness to ensure the electrical continuity of the track.

Thanks to this antenna design, whatever the position, within the tolerance limit T, of the insert and its antenna relative to the card body during the assembly and then the embossing of the card, at least one of the two tracks connected in parallel remains functional, in that the operation of embossing the characters cannot cut it completely, because there remains, at the level of each of the characters, at least one track portion not cut by the embossing operation, which guarantees the electrical continuity of that track.

The two divided tracks connected in parallel are preferably connected by interconnection bridges, which has the effect of limiting the effect of cutting of some tracks during the embossing of the characters. The width of the interconnection bridges is then substantially equal to T−j+2c, where T designates the tolerance for positioning the antenna in the card body, j designates the interval between two character columns, and c designates the minimum remaining track thickness to ensure the electrical continuity of the track.

Two adjacent bridges are spaced by a distance D substantially equal to n(e+j), where e is the width of a character, i is the interval between two adjacent characters, and n is the number of characters between two bridges, n having to be optimized according to the required quantity of metal for the antenna.

The invention also consists in a smart card including an antenna optimized as described above.

Other features and advantages of the invention will become apparent on reading the detailed description and from the appended drawings in which.

DETAILED DESCRIPTION

Figure 1:
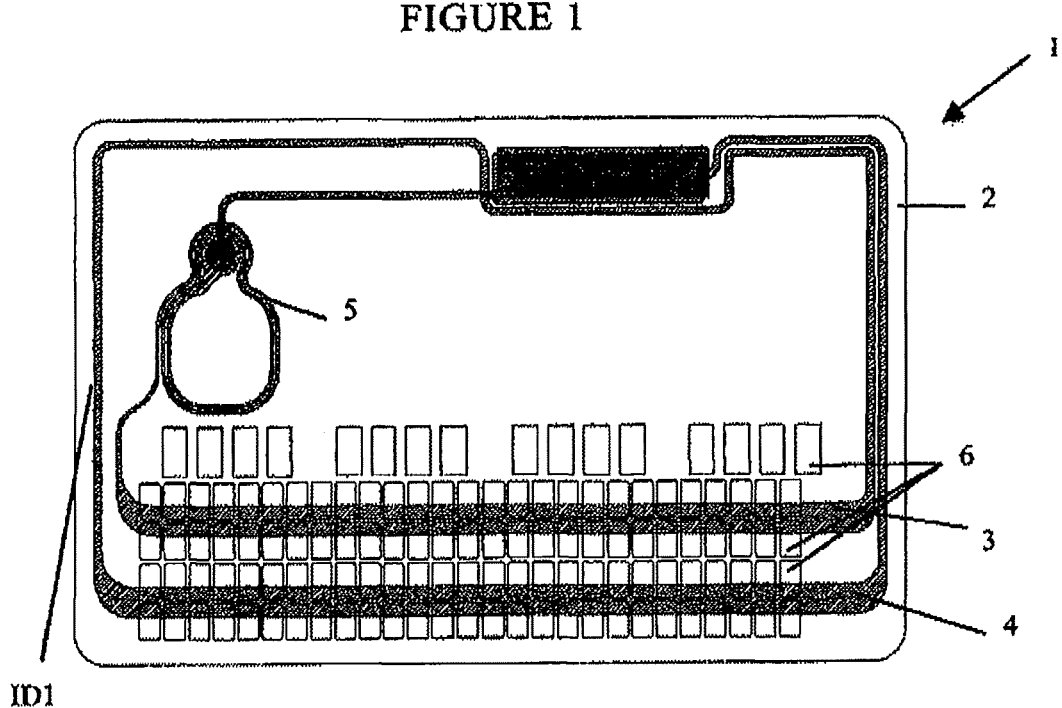
FIG. 1 represents a known contactless smart card in plan view, showing the character embossing area and the antenna.

Turn to FIG. 1. The known smart card 1, shown in plan view, includes a card body 2 including an antenna ID1, termed the main antenna, consisting of two turns of large size, and a secondary antenna or concentrator 5 intended to concentrate the electromagnetic flux. The turns of the antenna ID1 (simply denoted ID1 in FIG. 1), namely the turns of large size that run along the card edges and therefore have a format close to the ID1 format, overlap the area of the card body intended to receive the lines 6 of alphanumeric characters. The locations of the characters to be embossed are represented by rectangles and the characters themselves are not shown and vary from one card to another.

Given the tolerance T of approximately 1.5 mm for positioning the antenna ID1 in the card body, the horizontal sections of the turns of the antenna ID1 can be at positions varying from one card to another. In particular, the tracks 3, 4 of the antenna ID1 can be superimposed on a line 6 of characters and so these tracks can be broken during the embossing operation, which of course renders the card inoperative.

To prevent this, there is provision in the prior art corresponding to FIG. 1 for the tracks 3, 4 of the antenna ID1 to be designed to be slightly wider than a line of characters, so that the embossing of the characters cannot cut a track completely. But as explained above this design with wide tracks renders the smart cards more sensitive to the problem of delamination of the cards.

Figure 2:
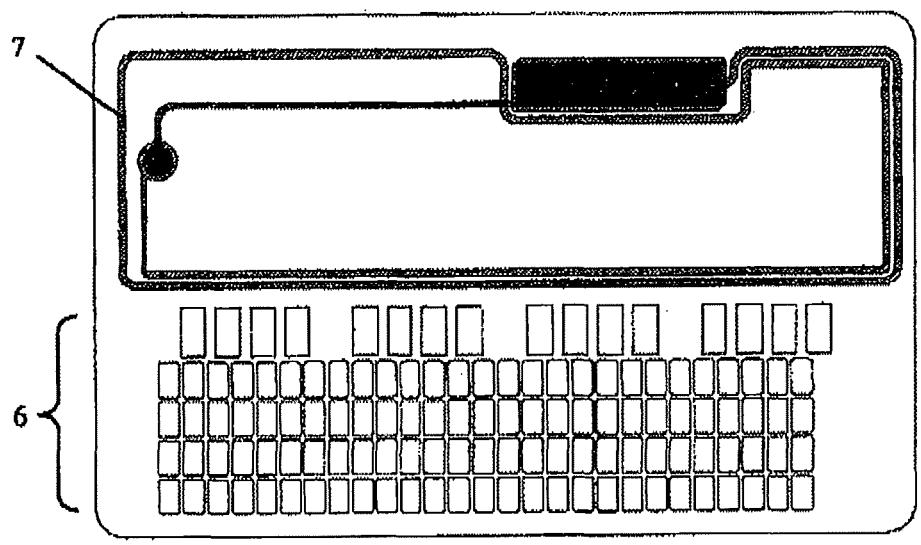
FIG. 2 shows another known contactless smart card, in which the antenna is situated outside the character embossing area.

Another known way to attempt to remedy the problem consists, as shown in FIG. 2, in producing the main antenna 7 not to the so-called ID1 format but with smaller turns that do not overlap the character embossing area. But this reduces the electromagnetic flux picked up by the antenna and therefore has a negative effect on the communication performance of the antenna. In particular, it reduces the communication range of the contactless smart card.

Figure 3:
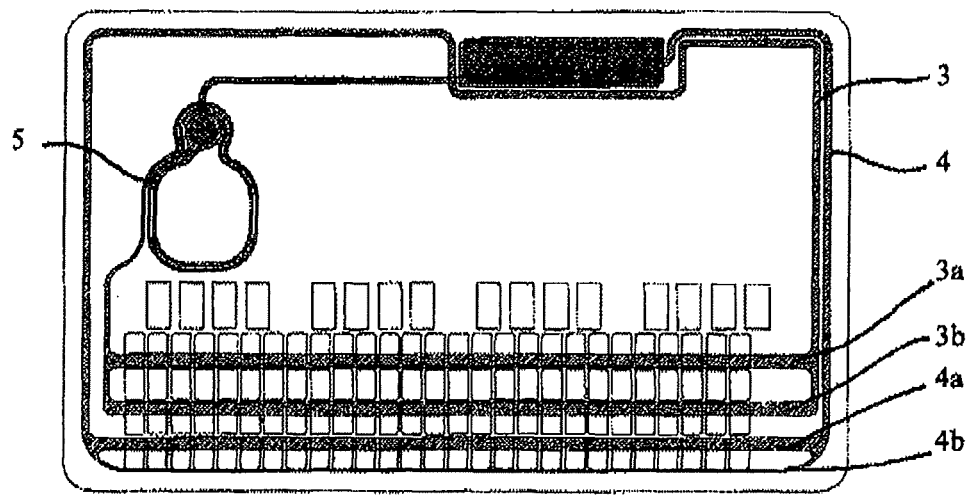
FIG. 3 shows a contactless smart card according to the invention, provided with an antenna the tracks of which situated in the embossing area are divided.
Figure 4A:
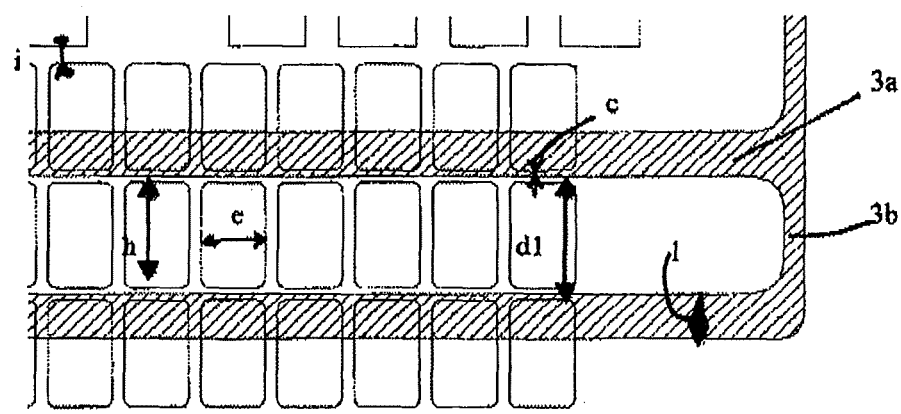
FIG. 4A shows a more detailed view of the embossing area of the smart card from FIG. 3, for tracks surrounded by two lines of characters.
Figure 4B:
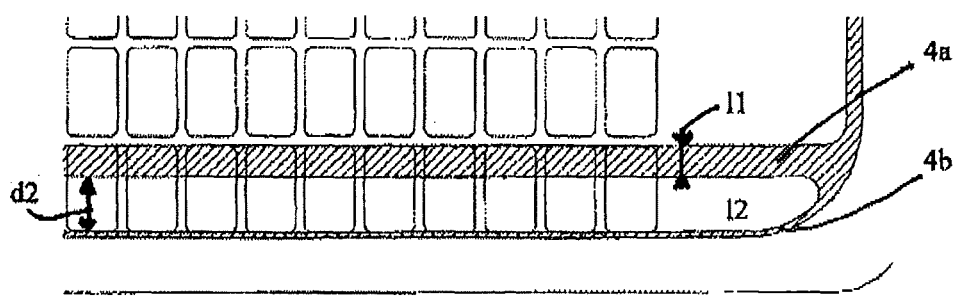
FIG. 4B shows a more detailed view of the embossing area of the smart card from FIG. 3, for antenna tracks situated at the card edge.

Turn to FIGS. 3 and 4A, 4B for an explanation of the solution according to the invention. As can be seen, the track 3 of the smart card 1 from FIG. 1 has been replaced by two tracks 3a, 3b electrically connected in parallel and each having a width less than the wide track 3 in FIG. 1. Likewise, the track 4 of the smart card 1 from FIG. 1 has been replaced by two tracks 4a, 4b electrically connected in parallel and each having a width less than the wide track 4 from FIG. 1.

Moreover, as seen in FIGS. 4A, 4B showing an enlargement of FIG. 3 in two different situations, namely the situation of a pair of tracks 3a, 3b surrounded by lines 6 of characters above and below the lines (FIG. 4A), and the situation of a pair of tracks 4b situated at the card edge (FIG. 4B), the positions and dimensions of the pairs of tracks 3a, 3b and 4a, 4b are calculated in a specific manner on the one hand to preserve acceptable radio frequency properties and on the other hand to solve the problem caused by the embossing of the characters.

The following parameters are defined:

l designates the width of the tracks 3a, 3b, l1, l2 designate the width of the tracks 4a, 4b, respectively, h designates the height of the characters 6 and e their width, i designates the horizontal interval between two lines 6 of characters, j designates the vertical intrval between two columns 6 of characters, d1, d2 designate the distance between two pairs of tracks 3a, 3b and 4a, 4b, respectively, T designates the tolerance for positioning the antenna in the card body, c designates the required minimum remaining width of a partially cut track, capable of ensuring the electrical continuity of the track.

In order to solve the problem posed by the embossing of the characters and the necessity of ensuring the electrical continuity of the tracks, the tracks $3a$ and $3b$ are separated by a distance d1 that is greater than the height h of a character 6, without being completely in the area for embossing an adjacent line of characters. The tracks $3a$, $3b$ are preferably sized and positioned so that at least a width c of track from 100 to 200 micrometers remains outside the character embossing area.

Then, as is clear from FIG. 4A: d1=h+i/2+i/2=h+i. In other words, the invention makes the distance between two pairs of tracks $3a$, $3b$ connected in parallel and surrounded by lines of embossed characters equal to the height of a character plus the interval i between two lines 6 of characters.

Moreover, according to the invention the widths l of the divided tracks $3a$, $3b$ are as follows: l=T−l+2c, where the tracks $3a$, $3b$ are concerned (FIG. 4A), where c is the minimum remaining width of the partially cut track.

This ensures that the embossing of the track $3a$ or the track $3b$ leaves on each of these tracks a conductive line of minimum width equal to i/2, enabling adequate operation of the antenna, despite the tolerance T for positioning the antenna in the card.

Figure 5:
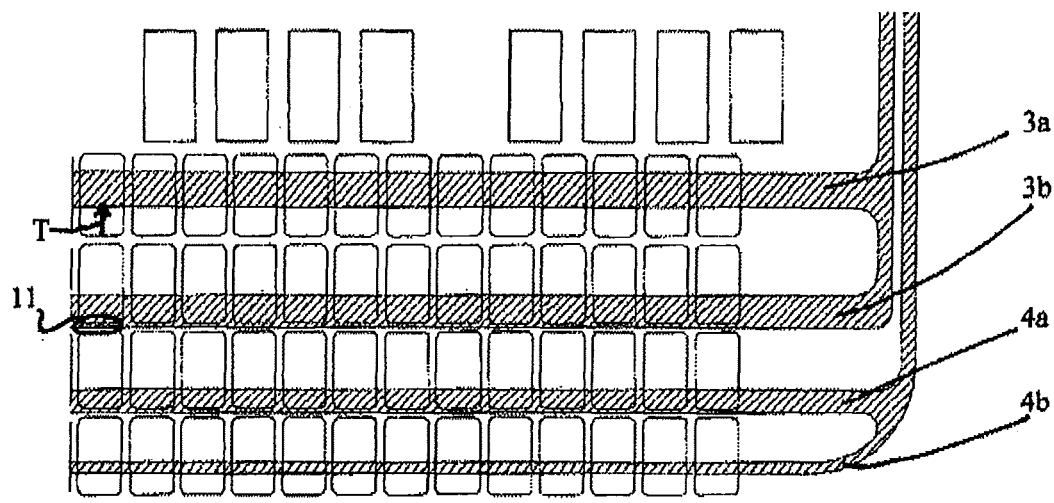
FIG. 5 shows a more detailed view of the embossing area of the smart card from FIG. 3, in the case of an upward offset of the antenna.
Figure 6:
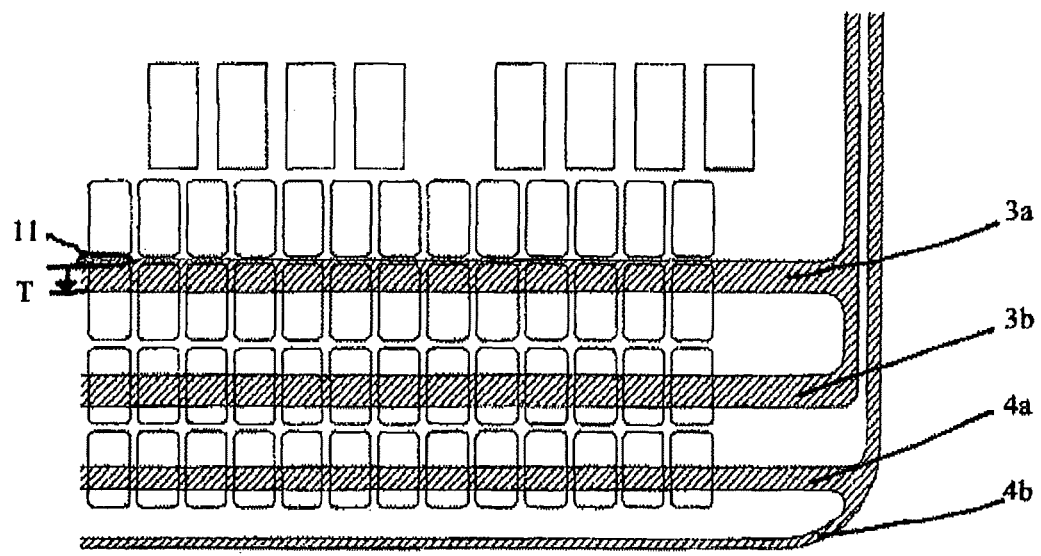
FIG. 6 shows a more detailed view of the embossing area of the smart card from FIG. 3, in the case of a downward offset of the antenna.

In fact, assume that the antenna is offset by an amount T relative to its position shown in FIG. 4A, by an upward offset as shown in FIG. 5, or a downward offset as shown in FIG. 6. In the first case, the track $3a$ will be located in the embossing area and risks being cut. On the other hand, the track $3b$ will be partially located in the embossing area but will include an area l1 necessarily situated outside the embossing area and of minimum thickness i/2, enabling operation of the antenna. In the second case, it is the track $3b$ that will be cut and the track $3a$ that will retain an area l1 situated outside the embossing area.

As is clear from FIG. 4B, corresponding to the situation where only one track $4a$ is surrounded by characters, and where the respective widths of the tracks $4a$, $4b$ are concerned:

$$l1 = T\ i + c$$

$$l2 = c$$

Moreover, the tracks $4a$, $4b$ are separated by a distance d2=h−l1.

This ensures that the embossing in the vicinity of the tracks $4a$, $4b$ leaves a conductive line of minimum width equal to l1−i/2, allowing adequate operation of the antenna, despite the tolerance T for positioning the antenna in the card.

In fact, assume that the antenna is offset by an amount T relative to its position shown in FIG. 4B, by an upward offset as shown in FIG. 5, or a downward offset as shown in FIG. 6. In the first case, the track $4b$ will be entirely in the embossing area and will be cut, but on the other hand the track $4a$ will be located partially outside the embossing area. In the second case (downward offset), the track $4a$ will be located in the embossing area, but the track $4b$ will be entirely located outside that area.

Moreover, this makes it possible to reduce the width l2 of the tracks of type $4b$ situated at the edge, which promotes a lower sensitivity to delamination without degrading the electrical continuity of the antenna.

Figure 7:
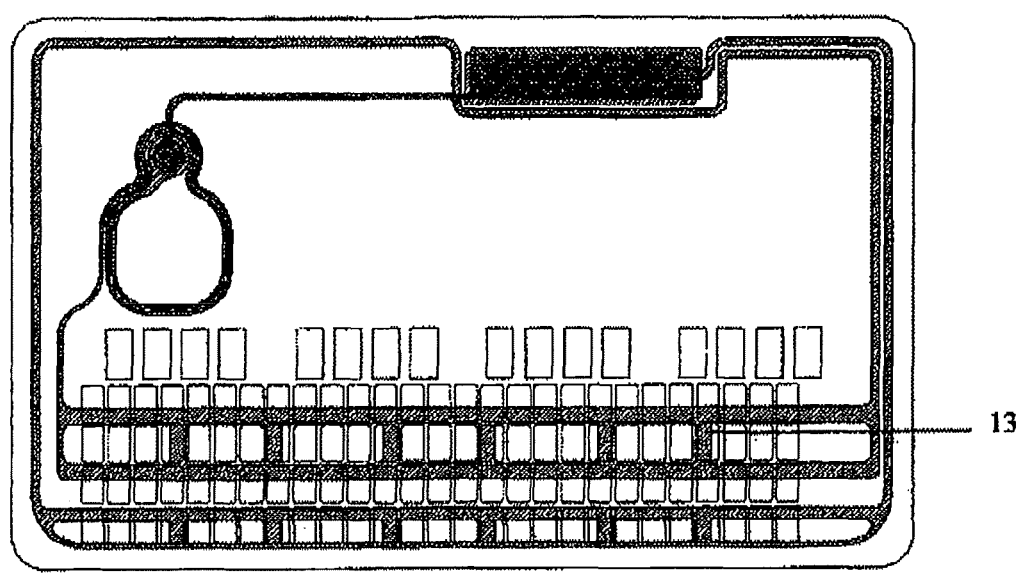
FIG. 7 shows a variant embodiment of the antenna according to the invention.
Figure 8:
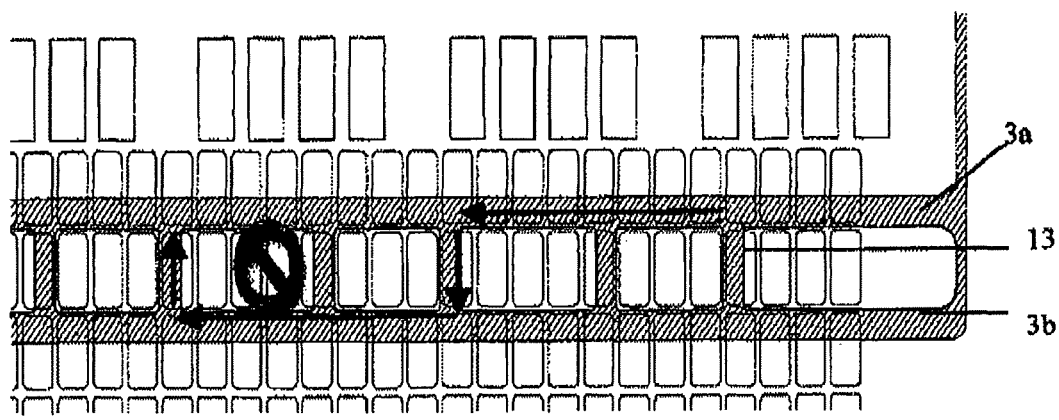
FIG. 8 shows a more detailed view of the FIG. 7 embodiment.

Any cutting of a track $3a$, $3b$, $4a$ or $4b$ will undoubtedly impact on the value of the inductance of the antenna, the performance of which will necessarily be slightly modified. In order to limit the impact of cutting of one of the paired tracks, the invention provides a preferred embodiment, shown in FIGS. 7 and 8. To this end, the invention provides bridges 13 for the interconnection at regular intervals of the paired tracks $3a$, $3b$, $4a$, $4b$.

In order to compensate the effects of the tolerance T for positioning the antenna in the card, the width of these bridges 13 is equal to the width of the connected tracks, i.e. also to the value of the tolerance T.

If the characters are spaced horizontally by an interval j and if the characters have a width e, then the adjacent bridges 13 are preferably spaced by a distance D=n(e+j), where n is an integer.

In this way, the bridges 13 at least partially avoid cutting caused by the embossing.

ADVANTAGES OF THE INVENTION

In the final analysis, the invention proposes an antenna design for smart cards making it possible to achieve the target objectives. In particular, the narrower antenna tracks in the embossing area reduce the risk of delamination of the card. Moreover, this design is compatible with the operations of embossing the characters because none of the tracks that coexist with the embossing area can be broken completely during the embossing.

The invention claimed is:

1. An antenna for a contactless smart card, arranged on an insert intended to be integrated in said smart card with a certain relative vertical or horizontal positioning tolerance T between the insert and the body of the card, said smart card including an embossing area comprising lines of characters embossed in relief, at least one antenna turn being situated opposite the embossing area, characterized in that said turn comprises at least one pair of tracks situated in the embossing area and connected in parallel, said tracks being configured in such a way that at least one of them remains at least partially situated outside of the embossed character area whatever the relative position of the insert and its antenna allowed by the tolerance T.

2. The antenna as claimed in claim 1, in which the lines of characters have a height h and are separated by a line spacing of width i and the antenna includes a pair of tracks connected in parallel and each situated at least partially facing at least one line of characters, wherein said tracks of the antenna are spaced by an interval d1=h+i.

3. The antenna as claimed in claim 1, wherein the width l of the tracks of a turn connected in parallel is substantially equal to T−i+2c where T designates the tolerance for positioning of the antenna in the card body, i designates the interval between two lines of characters, and c designates the minimum track width permissible to ensure the electrical continuity of said track.

4. The antenna as claimed in claim 1, wherein the positioning and the sizing of a pair of tracks of a turn are such that if a first track impinges by an amount c on a line spacing between two lines of characters the other track also impinges by an amount c on another line spacing between two other lines of characters.

5. The antenna as claimed in claim 4, wherein the widths l1, l2 of the respective tracks are substantially equal to l1=T−l+c and l2=c, where T designates the tolerance for positioning the antenna in the card body, l designates the interval between two lines of characters, and c designates the minimum remaining track thickness to ensure the electrical continuity of the track.

6. The antenna as claimed in claim 1, in which the lines of characters have a height h and are separated by a line spacing of width i and the antenna includes a first track of width l1 situated at least partially facing at least one line of characters and a second track of width l2 situated at the periphery of the embossing area, wherein said tracks are spaced by an interval d2=h−l1.

7. The antenna as claimed in claim 1, wherein each pair of tracks connected in parallel is interconnected by interconnection bridges configured to limit the effect of cutting of one of the tracks when embossing the characters.

8. The antenna as claimed in claim 7, wherein two adjacent bridges are spaced by a distance D substantially equal to n(e+j), where e is the width of a character, j is the interval between two adjacent character columns, and n is the number of characters spacing two successive interconnection bridges.

9. The antenna as claimed in claim 7, wherein the width of the interconnection bridges is substantially equal to T−j+2c, where T designates the tolerance for positioning the antenna in the card body, j designates the interval between two character columns, and c designates the minimum remaining track thickness to ensure the electrical continuity of the track.

10. A contactless smart card, including an embossing area including lines of characters embossed in relief, wherein it includes an antenna according to claim 1.

11. A contactless smart card, comprising:
a body;
an insert integrated in said contactless smart card with a certain relative vertical or horizontal positioning tolerance between the insert and the body;
an embossing area including lines of characters embossed in relief; and
an antenna arranged on the insert and including at least one antenna turn being situated opposite the embossing area, said at least one antenna turn comprising at least one pair of tracks situated in the embossing area and connected in parallel, said tracks being configured such that at least one of the tracks remains at least partially situated outside of the embossed character area regardless of the relative position of the insert and the antenna allowed by the tolerance.

* * * * *